United States Patent [19]
Kiyose et al.

[11] Patent Number: 5,990,304
[45] Date of Patent: *Nov. 23, 1999

[54] CELLULOSE ACETATE EXCELLENT IN PHYSICAL STRENGTH, AND PROCESS FOR PRODUCTION THEREOF

[75] Inventors: Atsunobu Kiyose; Shu Shimamoto; Yuichiro Shuto; Hiroki Taniguchi, all of Hyogo, Japan

[73] Assignees: Daicel Chemical Industries, Ltd., Sakai; Fuji Photo Film Co., Ltd., Minamiashigara, both of Japan

[*] Notice: This patent is subject to a terminal disclaimer.

[21] Appl. No.: 09/169,472

[22] Filed: Oct. 9, 1998

Related U.S. Application Data

[63] Continuation of application No. 08/750,182, filed as application No. PCT/JP96/00861, Mar. 29, 1996.

[30] Foreign Application Priority Data

| Mar. 31, 1995 | [JP] | Japan | 7-100710 |
| Apr. 11, 1995 | [JP] | Japan | 7-85551 |
| Oct. 10, 1995 | [JP] | Japan | 7-292668 |
| Mar. 19, 1996 | [JP] | Japan | 8-62603 |

[51] Int. Cl.$^6$ .................. C08B 3/06; C08B 1/02
[52] U.S. Cl. .................. 536/69; 536/69; 536/70; 536/76; 536/80
[58] Field of Search .................. 536/69, 70, 71, 536/74, 80

[56] References Cited

U.S. PATENT DOCUMENTS

| 4,024,334 | 5/1977 | Chandler et al. | 536/65 |
| 4,162,359 | 7/1979 | Leithem et al. | 536/70 |
| 4,269,972 | 5/1981 | Yabune et al. | 536/71 |
| 4,306,060 | 12/1981 | Ikemoto | 536/69 |
| 4,312,980 | 1/1982 | Motozato et al. | 536/76 |
| 4,501,886 | 2/1985 | O'Brien | 536/57 |
| 4,551,389 | 11/1985 | Ohtake et al. | 428/402 |
| 4,697,007 | 9/1987 | Seitz et al. | 536/83 |
| 4,983,730 | 1/1991 | Domeshek et al. | 536/69 |
| 5,047,180 | 9/1991 | Steiner et al. | 264/5 |
| 5,114,535 | 5/1992 | Burley et al. | 162/9 |
| 5,142,034 | 8/1992 | Bellas et al. | 536/58 |
| 5,244,945 | 9/1993 | Elion | 524/10 |
| 5,288,318 | 2/1994 | Mayer et al. | 106/213 |
| 5,371,207 | 12/1994 | Zhuang | 536/58 |
| 5,449,555 | 9/1995 | Karstens et al. | 428/364 |
| 5,478,386 | 12/1995 | Itoh et al. | 106/169 |
| 5,597,912 | 1/1997 | Edgar et al. | 536/63 |
| 5,663,310 | 9/1997 | Shimoda et al. | 536/69 |
| 5,914,397 | 6/1999 | Kiyose et al. | 536/71 |

*Primary Examiner*—Howard C. Lee
*Attorney, Agent, or Firm*—Flynn, Thiel, Boutell & Tanis, P.C.

[57] ABSTRACT

An object of the invention is to obtain cellulose acetate with improved physical properties, particularly film strength arid improved flexibility of the molded product. Cellulose acetate wherein average degree of acetylation is not less than 59%, viscosity average degree of polymerization (DP) is not less than 290, and concentrated solution viscosity ($\eta$) according to the falling ball viscosity method for viscosity average degree of polymerization (DP) is expressed by the following formula (1): $2.814 \times \ln(DP) - 11.753 \leq \ln(\eta) \leq 7.28 \times \ln(DP) - 37.059$ (1) and a process for production thereof.

11 Claims, 1 Drawing Sheet

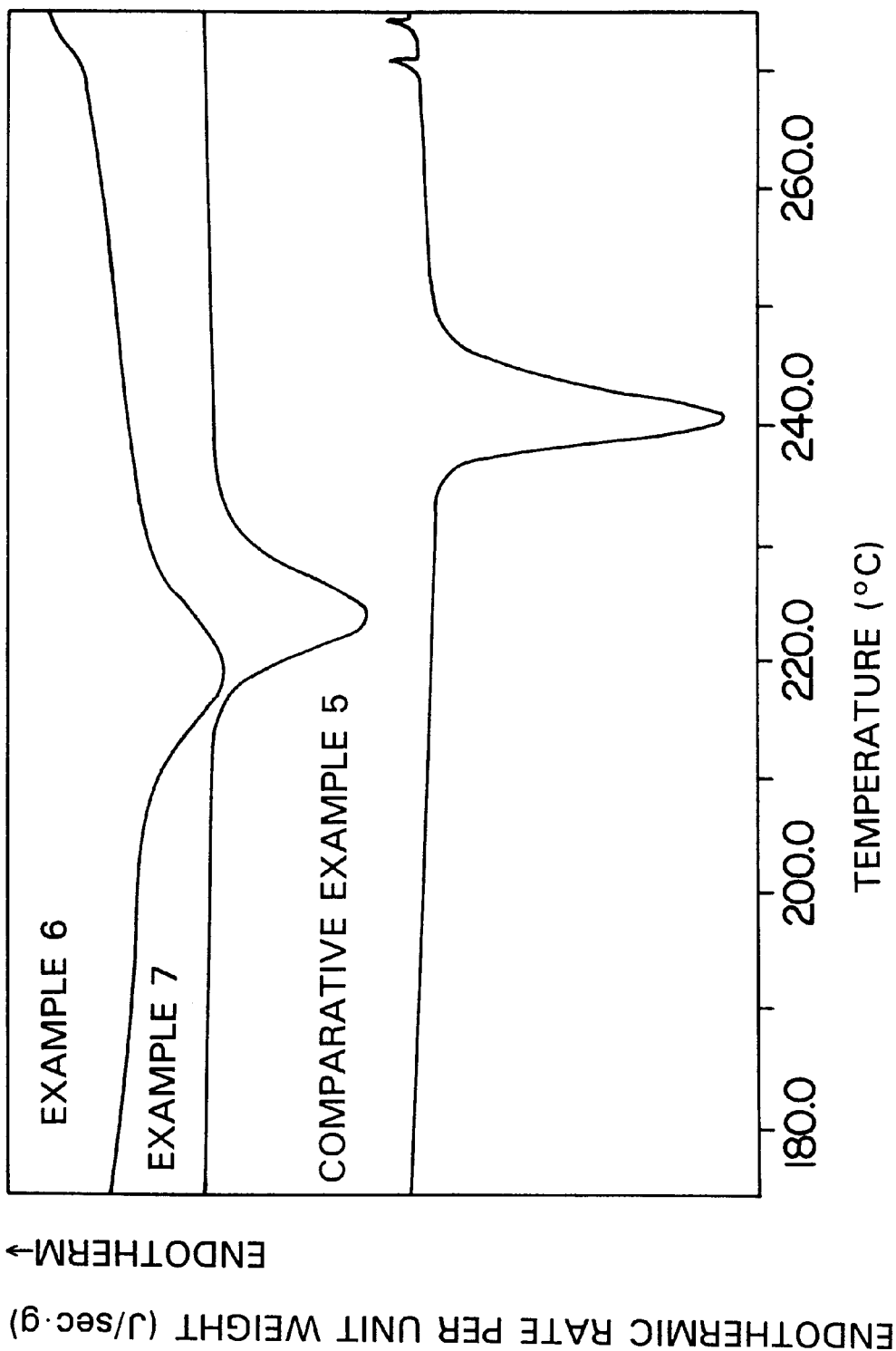

CELLULOSE ACETATE EXCELLENT IN PHYSICAL STRENGTH, AND PROCESS FOR PRODUCTION THEREOF

This is a continuation of Ser. No. 08/750 3.82, filed Nov. 21, 1996, now U.S. Pat. No. 0.5,914,397 which is a 371 of PCT/JP96/00861, filed Mar. 29, 1996.

FIELD OF THE INVENTION

The present invention relates to cellulose acetate useful as a raw material for plastics, films, fibers, medical materials, and a process for production thereof.

BACKGROUND ART

Cellulose acetate, particularly cellulose triacetate, which has excellent physical properties, particularly good processability and high optical properties, has been utilized through many years in the field of plastics, fibers, films (e.g., photographic film, etc.). Further, cellulose acetate has attracted attention from the viewpoint of global environment, because it possesses biodegradability.

In general, cellulose acetate is a semi-synthetic polymer obtained by esterification from cellulose as a starting material using acetic anhydride. Presently commercially available cellulose acetates may be roughly divided into two groups mainly according to degree of acetylation thereof. One is cellulose triacetate (hereinafter referred to as CTA) having degree of acetylation of not less than 59%. The other is cellulose diacetate of wide range. Among them those having degree of acetylation of about 50 to 59% are referred to as cellulose diacetate (CDA). In other words, it is cellulose acetate solubLe in acetone.

As for use of cellulose acetate, in particular, CTA includes, it can be used as various films including base materials for photographic film as well as fibers and medical materials. In general, molded product of cellulose acetate is rigid and brittle. Such properties may become more significant the higher acetylation degree becomes. Physical properties of polymeric materials greatly depend on their crystallizability. That is, those having high crystallizability are imparted with strength while flexibility, for example, elongation is reduced, resulting in brittle product. Of course, CTA is not an exception, and has high crystallizability due to the homogeneity of its structure. That is, in cellulose acetate, higher degree of acetylation results in higher crystallizability. In general, lower molecular weight material becomes a nucleus, forming a crystal. Accordingly, when CTA, CDA are used, a plasticizer is generally added to impart flexibility to the molded product. For example, acetate plastics used for a grip of a screw-driver and the like often utilizes phthalate plasticizer such as diethyl phthalate. Cellulose acetate, particularly, CTA, is used as raw materials for various films due to its excellent transparency, while it has defects, for example, providing rigid and brittle film. To overcome its physical defects, a plasticizer is also used in this case. Addition of a component such as a plasticizer is accompanied not only with poor yield of the final product due to bleedout during molding as well as with economical disadvantage. Thus, cellulose acetate with excellent physical properties as well as characteristics of CTA has been expected.

On the other hand, as increase of the uses of cellulose acetate, speeding up of processing technique is required, and high speed molding, high speed spinning, high speed processing of the molded product have been tried. For example, in the production of film, it is proposed to cast a solution of cellulose acetate at a high speed to mold into film. In order to improve moldability corresponding to such speeding up, it is proposed that average degree of polymerization of cellulose acetate is reduced to lower solution viscosity of cellulose acetate. However, using cellulose acetate with low degree of polymerization, physical strength of the molded product is impaired.

Among cellulose acetates, cellulose triacetate which has been used in various purposes, is crystalline and its solubility in a solvent is reduced as crystallization properties increase. To improve solubility in a solvent and moldability of cellulose triacetate, it is considered to be useful to make amorphous or lower crystallizability by reducing degree of substitution of cellulose triacetate. However, when degree of substitution of cellulose triacetate is reduced, hygroscopicity is increased and dimensional accuracy of the molded product is impaired.

Therefore, it is difficult to improve solubility in a solvent, moisture resistance, moldability and the like by reducing crystallizability of cellulose acetate.

Accordingly, an object of the present invention is to further improve characteristics of CTA and improve physical properties of the molded product, and to provide a process for production of such cellulose acetate.

An another object of the present invention is to provide cellulose acetate with low crystallizability and excellent moldability.

Still another object of the present invention is to provide cellulose acetate with high solubility in a solvent and moldability, in spite of high average degree of polymerization and high average degree of substitution.

DISCLOSURE OF THE INVENTION

The present inventors have studied intensively to attain the above objects. As the results, we have found that reduction of crystallizability of the material results in improvement of physical properties, in particular film strength, as well as improved flexibility of the molded product. Further, we have found that crystallizability and the like have a great effect on the moldability of cellulose acetate. The present invention has been completed on the basis of this finding.

That is, the present invention relates to cellulose acetate having average degree of acetylation of not less than 59%, viscosity average degree of polymerization (DP) of not less than 290, and concentrated solution viscosity ($\eta$) according to falling ball viscosity method for viscosity average degree of polymerization (DP) is expressed by the following formula (1): $2.814 \times \ln(DP) - 11.753 \leq \ln(\eta) \leq 7.28 \times \ln(DP) - 37.059$ (1)

In addition, the present invention relates to a process for producing cellulose acetate wherein average degree of acetylation is not less than 59%, viscosity average degree of polymerization (DP) is not less than 290, and concentrated solution viscosity ($\eta$) according to falling ball viscosity measurement for viscosity average degree of polymerization (DP) is expressed by the following formula (1): $2.814 \times \ln(DP) - 11.753 \leq \ln(\eta) \leq 6.29 \times \ln(DP) - 31.469$ (1) which comprises reacting 10 to 15 parts by weight of sulfuric acid catalyst based on 100 parts by weight of cellulose.

After extensive investigation made for the purpose of attaining the above objects, the present inventors have found that crystallizability and the like has a great effect on moldability of cellulose acetate. The present invention has been completed basis on this finding.

Cellulose acetate of the present invention is characterized by heat for crystallization from the molten state (ΔHcr) of 5 to 17 J/g, and high moldability. The present invention includes the following aspects.

Cellulose acetate according to the present invention includes cellulose triacetate having viscosity average degree of polymerization (DP) of not less than 200, degree of acetylation of not less than 59%. Also included are cellulose triacetate having high film moldability with viscosity average degree of polymerization (DP) of 200 to 400, degree of acetylation of 59.0 to 62.5, and heat of crystallization from the molten state (ΔHcr) of 5 to 16 J/g.

Cellulose acetate according to the present invention is preferably acetate ester of cellulose (cellulose acetate), however, may include mixed acid ester with other organic acid [for example, ester with $C_{3-4}$ aliphatic organic acid such as cellulose acetate propionate, cellulose acetate butyrate, etc.), cellulose acetate phthalate, etc.], mixed acid ester with inorganic acid (for example, cellulose acetate nitrate).

The above formula (1) in the present invention can be obtained from the experiments carried out by the present inventors. In cellulose acetate having viscosity average degree of polymerization of not less than 290, viscosity of concentrated solution generally increases exponentially as degree of polymerization increases, while cellulose acetate according to the present invention behaves in the different way. Accordingly, we calculated the formula (1) according by plotting viscosity average degree of polymerization against concentrated solution viscosity according to falling ball viscosity test 1. It is particularly preferable to satisfy the following formula (2). $2.814 \times \ln(DP) - 11.753 \leq \ln(\eta) \leq 6.29 \times \ln(DP) - 31.469$ (2)

Cellulose acetate having concentrated solution viscosity closer to the lower limit of the formula (1) is likely to provide molded products such as films with excellent strength. Cellulose acetate which exhibits concentrated solution viscosity exceeding the upper limit of the formula (1) provides molded products such as films with poor physical strength. In general, it is difficult to produce the cellulose acetate exhibiting concentrated solution viscosity less than the lower limit of the formula (1).

The method for measurement of concentrated solution viscosity (η) according to falling ball viscosity method is as follows:

Falling Ball Viscosity Method 1

Cellulose acetate is dissolved in methylene chloride:methanol=8:2 (weight ratio) to obtain a solution having a cellulose concentration of 15% (by weight), and filled in a viscosity tube having an inner diameter of 2.6 mm, and after temperature is adjusted to 25° C., a steel ball (diameter, 3.15 mm; 0.135 g) was allowed to fall and a time (sec.) required for the ball to fall for a distance of 10 cm between two gage marks was determined as viscosity.

Cellulose acetate of the present invention can be produced by the sulfuric acid catalyst method. Cellulose acetate is generally produced by a process wherein cellulose is activated with acetic acid, etc., and triacetate is prepared with acetic anhydride using sulfuric acid catalyst, then degree of acetylation is adjusted by saponification (hydrolysis). In crystallization of said cellulose acetate, various factors, for example, the amount of catalyst, reaction temperature, reaction time, aging temperature (saponification temperature), aging time (saponification time) and the like in the reaction step are complicatedly implicated. Accordingly, heat of crystallization ΔHcr, average degree of polymerization DP, degree of acetylation can be controlled within a certain range by proper combination of the above factors. For example, to conveniently control heat of crystallization ΔHcr, a step wherein relatively large amount of sulfuric acid is used for esterification and degree of polymerization DP is controlled and to control saponification temperature as well as saponification time are useful. The amount of the sulfuric acid used varies depending on the other factors, however, it is 9 to 15 parts by weight, preferably about 10 to 15 parts by weight based on 100 parts by weight of cellulose. Saponification temperature is, for example, about 50 to 70° C., and saponification time varies depending on saponification temperature, however, is, for example, selected from the range from about 10 to 35 minutes. Among them, the method utilizing relatively large amount of sulfuric acid is particularly preferred. Sulfuric acid is reacted in the amount of 10 to 15 parts by weight based on 100 parts by weight of cellulose to provide a material for film with excellent physical properties.

As described above, physical properties of the molded product such as film often depend on their crystallizability. In CTA, it is readily crystallized due to its homogeneous molecular structure, resulting in rigid and brittle molded product. Accordingly, the present inventors consider to mimic molecular structure of CDA to impair crystallizability. The present invention has been completed on the basis of this idea.

In general, CTA has degree of acetylation of not less than 59%, however, most of the commercially available CTA has that of about 61%. The main difference between CDA and CTA in their process for production resides in hydrolysis step after preparing triacetate. In CDA, it is required to carry out hydrolysis to obtain degree of acetylation to be soluble in acetone, while it is preferable not to reduce degree of acetylation in CTA. Main object of hydrolysis in CTA is to hydrolyze bonded sulfuric acid to enhance thermostability. That is, sulfuric acid added as a catalyst bonds to cellulose, forming ester. The more sulfuric acid catalyst exists in acetylation reaction, the more bonded sulfuric acid, resulting in random distribution of glucose residue having unsubstituted hydroxyl groups in triacetate. It is considered that such cellulose acetate has less complete cellulose acetate region taking part in crystallization of the molecule, resulting in difficulty in crystallization.

Degree of acetylation can be lowered compared with that of the ordinary CTA by deacetylation during hydrolysis step. However, the present inventors have found that use of a large amount of sulfuric acid catalyst in the acetylation step provides CTA with more excellent physical properties.

The average degree of acetylation of the present invention is 59.0 to 62.5%. The reason is as follows. The present process using a large amount of sulfuric acid catalyst hardly provides product with degree of acetylation exceeding 62.5%. When degree of acetylation exceeds 62.5%, there is little difference between physical properties of the resulting product and those of the ordinary products. Degree of acetylation less than 59.0% is not preferred for molded product such as film, because of, for example, high hygroscopicity. Average degree of acetylation is more preferably in the range of 59.0 to 61.5%, particularly preferably 59.0 to 60.5%.

The reason of the improved physical properties of film and the like is considered that the molecular structure becomes heterogeneous and unnecessary crystals are not formed during molding, thereby increasing amorphous portions in the film, imparting flexibility and further transparency to the film. Surprisingly, according to the present invention, product with lower viscosity can be obtained compared with that having same molecular weight obtained by an ordinary method. It is also found that the process is advantageous in productivity. The fact that cellulose acetate obtained according to the present invention a exhibits solution properties different from those of the ordinary products suggests the above mentioned unique structure.

In the present invention, degree of acetylation of the obtained cellulose acetate is not less than 290, preferably not less than 310, because cellulose acetate with degree of polymerization of less than 290 provides molded product such as film, fiber and the like with extremely poor strength.

Cellulose acetate of the present invention is characterized by small heat of crystallization, that is low crystallinity, and high solubility in a solvent and high moldability. That is, heat of crystallization of cellulose acetate from molten state ($\Delta Hcr$) is 5 to 17 J/g, preferably 6 to 17 J/g (e.g., 7 to 16 J/g), more preferably 10 to 16 J/g. When heat of crystallization $\Delta Hcr$ is less than 5 J/g of, moldability upon casting or the like is impaired as solubility in a solvent decreases. When it is more than 17 J/g, crystallinity increases, impairing solubility in a solvent and increasing solution viscosity, resulting in difficulty in molding at high speed.

Since cellulose acetate of the present invention has the above mentioned heat of crystallization in spite of high moisture resistance and dimensional stability as well as high degree of acetylation, it has high solubility in a solvent and low solution viscosity as well as high moldability at high speed.

Since cellulose acetate of the present invention essentially has low crystallizability, molded product can be efficiently provided maintaining high moldability without any particular process. Cellulose acetate may be molded in various forms (e.g., powder, pellets, etc.) depending on the types of molding process, however, it is generally used as a cellulose acetate solution (dope).

Solvents for cellulose acetate solution can be selected according to degree of acetylation of cellulose acetate, and include, for example, halogenated hydrocarbon such as chloroform, dichloromethane, dichloroethane; nitro compounds such as nitromethane; esters such as methyl acetate; ketones such as acetone; cellosolves such as methyl cellosolve acetate and the like. Such solvent can be used alone or as a mixture thereof. In addition, carbon tetrachloride, alcohols such as methanol, ethanol, propanol, isopropanol, butanol, isobutanol, diacetonealcohol; nitropropane, ethyl acetate, butyl acetate, methyl propionate, ethyl lactate, methyl ethyl ketone, methyl cellosolve, cellosolve acetate and carbitols may be used, if necessary.

As described above, cellulose acetate of the present invention has high solubility in a solvent even with high degree of acetylation, cellulose acetate content in a solution and viscosity of cellulose acetate solution can be selected depending on the application. Solution viscosity of cellulose acetate can be an index of high speed moldability, particularly in casting method and spinning method. That is, since cellulose acetate with low solution viscosity enables cast coating and spinning at high speed, and the surface is smoothen in a short time (that is, high leveling), even high speed molding provides molded product with high moldability, resulting in improved production. Solution viscosity of cellulose acetate can be selected from the range wherein moldability at high speed is not impaired, for example, 15% solution viscosity containing 13% by weight of cellulose acetate and 2% by weight of triphenyl phosphate is 20 to 70 seconds, preferably about 30 to 65 seconds according to the falling ball viscosity method 2 described below.

Falling Ball Viscosity Method 2

Cellulose acetate such as CTA (42.7 parts by weight) is dissolved in a solvent mixture containing triphenyl phosphate [triphenyl phosphate/n-butanol/methanol/dichloromethane=6.8:8.4:42.1:230 (weight ratio)](287.3 parts by weight) to obtain a solution of cellulose acetate having 15% by weight of solid content including triphenyl phosphate. The solution iLs filled in a viscosity tube, then a steel is allowed to fall through the solution at 25° C. and a time (sec.) required for a steel ball to fall for a distance between two gage marks is determined as viscosity of 15% solution.

For molding of cellulose acetate of the present invention it can be used with other cellulose acetate ester (for example, an ester with an organic acid such as cellulose propionate, cellulose butyrate; an ester with an inorganic acid such as cellulose nitrate, cellulose sulfate, cellulose phosphate and the like) . To cellulose acetate may be optionally added, in addition to the above solvents, various additives, for example, ester type plasticizer (e.g., triacetin, triethylene glycol diacetate, triethylene glycol dipropionate, dibutyl phthalate, dimethoxyethyl phthalate, triethyl citrate ester, etc.), inorganic fine particles (e.g., kaolin, talc, diatomaceous earth, quartz, calcium carbonate, barium sulfate, titanium oxide, alumina, etc.), thermostabilizer (e.g., salt of alkaline earth metal such as calcium, magnesium, etc.), a coloring agent, etc.

Cellulose acetate of the present invention may be used in various molding methods to provide molded products. For example, it can be used in a process for production of film or sheet (photographic film, etc.) by casting method including spinning method, a process for production of fibers by spinning. Further, cellulose acetate of the present invention can be utilized in the applications, for example, plastics, lacquer of paint, electrical insulating material and the like.

BRIEF DESCRIPTION OF THE DRAWINGS

FIG. 1 is a chart showing results of measurement of heat of crystallization of cellulose acetate obtained in Examples 6 and 7, Comparative Example 5.

EXAMPLE

The following Examples will further illustrate the present invention, which by no means limit the present invention.

(1) Method for Measuring and Calculating Viscosity-average Degree of Polymerization Oven-dried cellulose acetate (about 0.2 g, precisely weighed) is dissolved in a solution of methylene An chloride:ethanol=9:1 (100 ml). A time (sec.) required for solution to drop is measured by Ostwald viscometer at 25° C. Degree of polymerization is obtained according to the following formula. As for a solvent mixture alone, time (sec.) required for dropping is measured in the same manner as described above, and viscosity average degree of polymerization is calculated according to the following formula.

$\eta_{rel}=t/t_0$ $[\eta]=(\ln \eta_{rel})c$ $DP=[\eta]/(6 \times 10^{-4})$ (wherein, t is a time (sec.) required for the sample solution to drop, $t_0$ is a time (sec.) required for the solvent to drop, c is concentration of cellulose acetate in the solution (g/liter))

(2) Heat of Crystallization (ΔHcr)

Crystallizability of cellulose acetate such as CTA can be evaluated using thermocompensating differential scanning calorimeter (DSC). That is, cellulose acetate is dissolved in a mixed solvent (dichloromethane/ethanol=9/1 (weight ratio)) to prepare a solution with cellulose acetate concentration of 15% by weight (dope), which is subjected to pressure filtration using unwoven fabric. There sulting dope is cast on a smooth glass sheet using a bar coater, and after air-dried for a day, the produced film is peeled off from the glass sheet and dried in a vacuum at 80° C. for 4hours. Thus obtained film-like sample (10mg) is filled in a standard aluminum pan, mounted on a sample bed of the calorimeter, maintained at a melting point corresponding to the type of cellulose acetate for a short time to melt cellulose acetate, then cooled to room temperature at the cooling rate of 4° C./min. to crystallize. CTA can be molten by maintaining at 305° C. for 2 minutes.

Heat of crystallization (ΔHcr) is obtained from the exothermic peak area under thus obtained DSC curve. Measurement of DSC is carried out in an atmosphere of nitrogen, and temperature calibration is carried out by two-point calibration of In (m.p.:156.60° C.) Sn (m.p.: 231.88° C.), while heat calibration is carried out by one-point calibration of In (quantity of heat of fusion: 28.45 J/g). Analysis of crystallization temperature is according to JIS K 7121-1987, and heat of crystallization is according to JIS K 7122-1987.

(3) Degree of Acetylation

Degree of acetylation can be determined by saponification method. That is, dried cellulose acetate such as CTA (1.9 g) is precisely weighed, and dissolved in 150 ml mixed solvent of acetone and dimethylsulfoxide (4:1, volume ratio), to which was added 1N aqueous sodium hydroxide and saponified at 25° C. for 2 hours. Phenolphthalein is added as an indicator and an excess of sodium hydroxide is titrated with 1N sulfuric acid (concentration factor: F). In the same method as described above, blank testis carried out. Degree of acetylation is calculated according to the following formula:

Degree of acetylation (%)=(6.005×(B−A)×F)/W (wherein A is volume (ml) of 1N sulfuric acid required for titration of the sample, B is volume (ml) of 1N sulfuric acid required for titration of blank test, F is a concentration factor of 1N sulfuric acid, W is weight of the sample).

(4) Process for Preparing Film

Film used for measurement of mechanical strength was prepared by dissolving a given amount of cellulose acetate and a plasticizer in a solvent, filtered and cast on a glass sheet keeping clearance and casting speed constant, followed by drying.

(5) Physical Properties of Film

Physical properties of film were measured as (i) tensile elongation, (ii) tensile strength, (iii) tearing strength, (iv) bending strength. Each evaluation method is shown below.
(i) Measurement of Tensile Elongation Film cut into 10cm length was stretched (initial length of the sample, 5 cm; stretching rate, 20 mm/min) according to IS01184-1983. Tensile elongation was obtained from the elongation of film at break.
(ii) Measurement of Tensile Strength Film cut into 10 cm length (initial length of the sample, 5 cm) was stretched at stretching speed of 20 mm/min. according to IS01184-1983, and tensile strength was obtained from the load at break.
(iii) Measurement of Tearing Strength Load required for tearing was determined according to IS06383/2-1983 using film cut into 5×6.4 cm.
(iv) Bending Strength According to IS08776-1988 using film cut into pieces of 12 cm length, the number of reciprocated bending required for the film to be broken was determined.

EXAMPLE 1

Cellulose (100 parts by weight) was esterified using sulfuric acid (11.7 parts by weight), acetic anhydride (260 part by weight), acetic acid (450 parts by weight) according to an ordinary method. Thereafter hydrolysis was carried out to give cellulose acetate wherein degree of acetylation was 60.2%, viscosity average degree of polymerization was 313, crystallization temperature (peak temperature Tpc) was 225° C., and heat of crystallization ΔHcr was 14.0 J/g. The relation between viscosity average degree of polymerization and concentrated solution falling ball viscosity was expressed as $\ln(\eta)$=4.53, that is, 4.41<$\ln(\eta)$<4.68<4.77, which satisfied formulae (1) and (2). Physical properties of such CTA are given in Table 1.

EXAMPLE 2

Cellulose (100 parts by weight) was esterified using sulfuric acid (11.7 parts by weight), acetic anhydride (260 parts by weight), acetic acid (450 parts by weight) according to an ordinary method. Thereafter hydrolysis was carried out for a longer period than that in Example 1, and the resulting cellulose acetate had degree of acetylation of 59.8%, viscosity average degree of polymerization of 326, crystallization temperature (peak temperature Tpc) of 217° C., heat of crystallization ΔHcr of 12.2 J/g. The relation between viscosity average degree of polymerization and concentrated solution falling ball viscosity was expressed as $\ln(\eta)$=4.80, that is, 4.53<$\ln(\eta)$<4.93<5.07, which satisfied formulae (1) and (2). Physical properties of this film are given in Table 1.

EXAMPLE 3

Cellulose (100 parts by weight) was esterified using sulfuric acid (10.2 parts by weight), acetic anhydride (260 parts by weight), acetic acid (450 parts by weight) according to an ordinary method. Thereafter, hydrolysis was carried out, and the resulting cellulose acetate had degree of acetylation of 60.6%, viscosity average degree of polymerization of 315, crystallization temperature (peak temperature Tpc) of 233° C., heat of crystallization ΔHcr of 15.8 J/g. The relation between viscosity average degree of polymerization and concentrated solution falling ball viscosity was expressed as $\ln(\eta)$=4.75, that is, 4.43<4.71<$\ln(\eta)$<4.82, which did not satisfy formula (2) but (1). Physical properties of such CTA are given in Table 1.

EXAMPLE 4

Cellulose (100 parts by weight) was esterified using sulfuric acid (11.7 parts by weight), acetic anhydride (260 parts by weight), acetic acid (450 parts by weight) according to an ordinary method. Thereafter, hydrolysis was carried out, and the resulting cellulose acetate had degree of acetylation of 60.2%, viscosity average degree of polymerization of 298, crystallization temperature (peak temperature Tpc) of 225° C., heat of crystallization ΔHcr of 14.0 J/g. The relation between viscosity average degree of polymerization and concentrated solution falling ball viscosity was expressed as ln(η)=4.32, that is, 4.28<ln(η)<4.37<4.42, which satisfy formulae (1) and (2). Physical properties of such CTA film are given in Table 1.

EXAMPLE 5

Cellulose (100 parts by weight) was esterified using sulfuric acid (10.2 parts by weight), acetic anhydride (260 parts by weight), acetic acid (450 parts by weight) according to an ordinary method. Thereafter, hydrolysis was carried out, and the resulting cellulose acetate had degree of acetylation of 60.8%, viscosity average degree of polymerization of 295, crystallization temperature (peak temperature Tpc) of 237° C., heat of crystallization ΔHcr of 16.7 J/g. The relation between viscosity average degree of polymerization and concentrated. solution falling ball viscosity was expressed as ln(η)=4.33, that is, 4.25<4.30<ln(η) <4.34, which did not satisfy formula (2) but (1). Physical properties of such CTA film are given in Table 1.

Comparative Example 1

Cellulose (100 parts by weight) was esterified using sulfuric acid (8 parts by weight), acetic anhydride (260 parts by weight), acetic acid (450 parts by weight) according to an ordinary method. Thereafter, hydrolysis was carried out, and the resulting cellulose acetate had degree of acetylation of 61.1%, viscosity average degree of polymerization of 322, crystallization temperature (peak temperature Tpc) of 243° C., heat of crystallization ΔHcr of 18.2 J/g. The relation between viscosity average degree of polymerization and concentrated solution falling ball viscosity was expressed as ln(η)=5.05, that is, 4.50<4.85<4.98<ln (η), which did not satisfy formula (1) and (2). Physical properties of such CTA are given in Table 1.

Comparative Example 2

Cellulose (100 parts by weight) was esterified using sulfuric acid (8 parts by weight), acetic anhydride (260 part by weight), acetic acid (450 parts by weight) according to an ordinary method for a shorter time compared with that in Comparative Example 1. Thereafter, hydrolysis was carried out, and the resulting cellulose acetate had degree of acetylation or 60.9%, viscosity average degree of polymerization of 293, crystallization temperature (peak temperature Tpc) of 239° C., heat of crystallization ΔHcr of 17.4 J/g. The relation between viscosity average degree of polymerization and concentrated solution falling ball viscosity was expressed as ln(η)=4.35, that is, 4.23<4.26<4.29<ln(η), which did not satisfy formula (1) and (2) Physical properties of such CTA film are given in Table 1.

Comparative Example 3

Cellulose (100 parts by weight) was esterified using sulfuric acid (8 parts by weight), acetic anhydride (260 parts by weight), acetic acid (450 parts by weight) according to an ordinary method. Thereafter, hydrolysis was carried out, and the resulting cellulose acetate had degree of acetylation of 60.9, viscosity average degree of polymerization of 312, crystallization temperature (peak temperature Tpc) of 239° C., heat of crystallization ΔHcr of 17.2 J/g. The relation between viscosity average degree of polymerization and concentrated solution falling ball viscosity was expressed as ln(η) 4.86, that is, 4.41<4.65<4.75<ln(η), which did not satisfy formula. (1) and (2). Physical properties of such CTA film are given in Table 1.

Comparative Example 4

Cellulose (100 parts by weight) was esterified using sulfuric acid (6 parts by weight), acetic anhydride (260 parts by weight), acetic acid (450 parts by weight) according to an ordinary method. Thereafter, hydrolysis was carried out, and the resulting cellulose acetate had degree of acetylation of 61.8%, viscosity average degree of polymerization of 280, crystallization temperature (peak temperature Tpc) of 257° C., heat of crystallization ΔHcr of 21.3 J/g. The relation between viscosity average degree of polymerization and concentrated solution falling ball viscosity was expressed as ln(η)=4.50, that is, 3.96<3.97<4.10<ln(η), which did not satisfy formula (1) and (2). Physical properties of such CTA film are given in Table 1.

TABLE 1

| | Physical Properties (MD/TD) | | | |
|---|---|---|---|---|
| | Tensile Elongation (%) | Tensile Strength (kg/mm$^2$) | Tearing Strength (gf) | Bending strength |
| Example 1 | 51/56 | 12.7/12.4 | 33/33 | 140/150 |
| Example 2 | 54/55 | 13.2/12.6 | 33/32 | 160/152 |
| Example 3 | 50/51 | 12.6/12.3 | 30/26 | 145/127 |
| Example 4 | 51/50 | 12.7/12.5 | 28/27 | 137/131 |
| Example 5 | 48/47 | 12.5/12.8 | 26/25 | 125/117 |
| Comparative Example 1 | 44/50 | 12.4/12.3 | 16/17 | 105/100 |
| Comparative Example 2 | 41/42 | 11.7/11.3 | 25/23 | 120/116 |
| Comparative Example 3 | 50/47 | 11.0/12.0 | 26/23 | 130/118 |
| Comparative Example 4 | 40/39 | 12.6/10.5 | 16/17 | 100/89 |

MD: Direction of casting film
TD: Direction perpendicular to that of casting film

EXAMPLE 6

Cellulose (moisture content 4%) was activated by aL pretreatment with acetic acid, then esterified with sulfuric acid (11.7 parts by weight), acetic anhydride (258 parts by weight) and acetic acid (440 parts by weight) based on 100 parts by weight of cellulose acetate, and neutralized with magnesium acetate. The resulting cellulose acetate was saponified and aged to obtain CTA with viscosity average degree of polymerization of 319 and degree of acetylation of 60.0%. The relation between viscosity average degree of polymerization and concentrated solution falling ball viscosity of such CTA was expressed as ln (η)=4.65, that is, 4.47<ln(η)<4.79<4.91, which satisfied formulae (1) and (2). Saponification time is 30 minutes.

EXAMPLE 7

In the same manner as described in Example 6, except that saponification time was shortened to 25 minutes and the amount of acetic anhydride used was 265 parts by weight, CTA with viscosity average degree of polymerization of 323 and degree of acetylation of 60.2% was obtained. The relation between viscosity average degree of polymerization and concentrated solution falling ball viscosity of such CTA was expressed as ln(η)=4.76, that is, 4.51<ln(η)<4.87<5.00, which satisfied formulae (1) and (2)

Comparative Example 5

In the same manner as described in Example 6, except that the amount of sulfuric acid used was reduced to 7.8 part by weight and saponification time was 40 minutes, CTA with viscosity average degree of polymerization of 322 and degree of acetylation of 61.1% was obtained. The relation between viscosity average degree of polymerization and concentrated solution falling ball viscosity of such CTA was expressed as ln(η)=5.05, that is, 4.50<4.85<4.98<ln(η), which did not satisfy formula (1) and (2).

Crystallization temperature (peak temperature Tpc), heat of crystallization ΔHcr, 15% solution viscosity (falling ball viscosity method 2) and film moldability, physical properties of film in cellulose acetates obtained in the above Examples 6, 7 and Comparative Example 5 were examined. As the results, the results given in Table 2 were obtained. In addition, results of the measurement of heat of crystallization (chart) are shown in FIG. 1. As for film moldability, a solution containing cellulose acetate of Examples 6, 7 or Comparative Example 5 at the concentration of 15% by weight (dope) was prepared in the same manner as described in the section of the above heat of crystallization (ΔHcr), and each solution was dropped onto a smooth glass sheet with spaces, and each dropped sample was cast using a bar coater, then surface condition of the coated film was relatively observed and compared. Film moldability of the sample was evaluated by ranking in the order of excellent, good and bad, the sample wherein the surface is smoothen in the shortest time being evaluated as excellent, and the sample required the longest time to smoothen the surface being evaluated as bad.

TABLE 2

|  | Example 6 | Example 7 | Comparative Example 5 |
| --- | --- | --- | --- |
| Degree of acetylation (%) | 60.0 | 60.2 | 61.1 |
| Average Degree of polymerization | 319 | 323 | 322 |
| Crystallization Temperature Tpc (° C.) | 220 | 224 | 241 |
| Heat of Crystallization ΔHcr (J/g) | 12.5 | 14.0 | 17.5 |
| Dropping time (sec.) of 15% Solution Viscosity | 55 | 61 | 82 |
| Film Moldability | Excellent | Excellent | bad |
| Tensile Elongation (%) | 48/54 | 44/43 | 44/43 |
| Tensile Strength (kg/mm²) | 12.9/12.9 | 12.3/11.3 | 12.0/12.0 |
| Tearing Strength (gf) | 27/28 | 32/32 | 23/25 |
| Bending strength | 171/171 | 132/119 | 104/101 |

As obvious from Table 2, cellulose acetate of Comparative Example 5 has high viscosity of concentrated solution and insufficient film moldability in spite of high degree of polymerization. On the other hand, cellulose acetates of Examples 6 and 7 had low concentrated solution viscosity and high moldability in spite of high degree of polymerization and degree of acetylation.

EXAMPLE 8

In the same manner as described in Example 6, except that saponification time was changed to 120 minutes and the amount of acetic anhydride used was 260 parts by weight, CTA with viscosity average degree of polymerization of 291, degree of acetylation of 59.0% crystallization temperature (peak temperature, Tpc) of 201° C., heat of crystallization ΔHcr of 8.5 J/g, and 15% solution viscosity (falling ball viscosity method 2) of 35.5 was obtained. The relation between viscosity average degree of polymerization and concentrated solution falling ball viscosity of such CTA was expressed as ln(η)=4.22, that is, 4.21<ln(η)<4.22<4.24, which satisfied formulae (1) and (2).

Comparative Example 6

In the same manner as described in Example 6, except that the amount of sulfuric acidusedand saponification time were adjusted, CTA with viscosity average degree of polymerization of 134 and degree of acetylation of 57.6% was obtained. The relation between viscosity average degree of polymerization and concentrated solution falling ball viscosity of such CTA was expressed as ln(η)=2.95, which did not satisfy formulae (1) and (2). Heat of crystallization ΔHcr was determined but crystallization behavior was not observed, and heat of crystallization ΔHcr was 0 J/g. In the same manner as described in the section of heat of crystallization, a solution containing 15% by weight of cellulose acetate (dope) was prepared, which was clouded with cellulose acetate incompletely dissolved in a solvent and unsuitable for molding film. Physical properties of film were as follows and unsuitable for practical use: tensile elongation, 30/25 (%); tensile strength 7.0/6.5 (kg/mm²); tearing strength 13/11 (gf); bending strength (85/97).

Cellulose acetate of the present invention has improved physical properties of the molded product, particularly film strength, and improved flexibility. In addition, it has small heat of crystallization and low crystallizability and is excellent in moldability. Further, it has high solubility in a solvent and high moldability in spite of high average degree of polymerization and average degree of substitution. Accordingly, molded product with high moisture resistance and dimensional accuracy can be obtained by a molding process with high processing speed using cellulose acetate solution with low solution viscosity.

What is claimed is:

1. A cellulose acetate characterized by having an average degree of acetylation of not less than 59%, viscosity average degree of polymerization (DP) of not less than 290, and a concentrated solution viscosity (η) according to the falling ball viscosity method for viscosity average degree of polymerization (DP) expressed by the following formula (1):

$$2.814 \times \ln(DP) - 11.753 \leq \ln(\eta) \leq 7.28 \times \ln(DP) - 37.059 \quad (1).$$

2. The cellulose acetate according to claim 1, wherein the average degree of acetylation is not less than 59%, viscosity average degree of polymerization (DP) is not less than 290, and the concentrated solution viscosity (η) according to the falling ball method for viscosity average degree of polymerization (DP) is expressed by the following formula (2):

$$814 \times \ln(DP) - 11.753 \leq \ln(\eta) \leq 6.29 \times \ln(DP) - 31.469 \quad (2).$$

3. The cellulose acetate according to claim 1, wherein the viscosity average degree of polymerizaticn (DP) is not less than 310.

4. The cellulose acetate according to claim 1, wherein the average degree of acetylation is 59 to 62.5%.

5. The cellulose acetate according to claim 4, wherein the average degree of acetylation is 59 to 61.5%.

6. The cellulose acetate according to claim 5, wherein the average degree of acetylation is 59 to 60.5%.

7. The cellulose acetate according to claim 1, wherein the heat of crystallization (ΔHcr) from the molten state is 5 to 17 J/g.

8. The cellulose acetate according to claim 7, wherein the heat of crystallization (ΔHcr) from the molten state is 5 to 16 J/g.

9. Cellulose acetate according to any one of claim 1 to 8, which is obtained by reacting 10 to 15 parts by weight of sulfric acid catalyst based on 100 parts by weight of cellulose.

10. A process for producing cellulose acetate according to any one of claims 1 to 9, which comprises reacting 10 to 15 parts by weight of sulfuric acid catalyst based on 100 parts by weight of cellulose.

11. The cellulose acetate according to claim 2, wherein the viscosity average degree of polymerization (DP) is not less than 310.

* * * * *

UNITED STATES PATENT AND TRADEMARK OFFICE
CERTIFICATE OF CORRECTION

PATENT NO. : 5,990,304  
DATED : November 23, 1999  
INVENTOR(S) : Atsunobu Kiyose et al.

It is certified that error appears in the above-identified patent and that said Letters Patent is hereby corrected as shown below:

Title page,  
Under "Foreign Application Priority Data" please change the priority date for Japanese Application No. 7-292668 from "Oct. 10, 1995" to -- Nov. 10, 1995 --

Column 12,  
Line 45, in "formula (2)" change "814" to -- 2.814 --.

Please cancel Claims 9 and 10 in this patent as they were canceled when the patent application was filed.

Signed and Sealed this

First Day of January, 2002

Attest:

JAMES E. ROGAN  
Director of the United States Patent and Trademark Office

Attesting Officer